(12) United States Patent
Edwards

(10) Patent No.: X8664
(45) Date of Patent: Mar. 2, 1835

(54) POWER, PROPELLING MACHINERY, CALLED LEVER & DEAD WEIGHTS

(76) Inventor: Luke M. Edwards

Luke M Edwards. Trenton Tennessee

Letters Patent.

The Schedule referred to in these Letters Patent and making part of the same. Containing a description in the words of the said Luke M Edwards himself of his improvement in the Lever and dead weight plan of Machinery To all whom these presents shall come.
Be it known that Luke M Edwards of Trenton. County of Gibson and State of Tennessee have invented a new and useful improvement in machinery. and that the following is a full and exact description thereof.

The Shaft of the Wheel from eight feet in Length. to any length that may be required. inclined two and a quarter inches to the foot for any size Wheel. having the bottom end of the Gudgeon. belonging to the bottom end of the Shaft to work in a round hole in an Tub. The Gudgeon in the top end of the Shaft to run in a circle on a friction Roller or confined in the end of the Lever here-after described The circle to be of a size sufficient to give the shaft an incline of two and a quarter inches to the foot. The Stay with one end confined on top of the Shaft reaching one third of the way round the circle from the top Gudgeon confined in the Shaft with a friction Roller to the end that works in the circle. which circle is to be lined with metal to prevent its wearing. The arms of the Wheel are so put in as to make the top of the same always level when the shaft is moving round in any part of the circle. The Arms to be braced in the usual way of bracing them on the inclined plan. the rim of the Wheel to be put on top of the arms. and trained in the usual ways of training Wheels either on the inclined or level plan. The dead weight confined on the
rim of the Wheel opposite the two friction points running in
the circle "to wit" the Gudgeon in the top end of the Shaft &
the end of the Stay running in the circle. The rim of the Wheel
may be geared on the spur or cog. plan suitable for the machine
to the gear. The Lever is to work on a Gudgeon let into a shaft
pointing downwards to the center of the circle. The shaft this
gudgeon is confined in is to be confined at the top end of the
guides or cross guides above and braced so as to be steady.
This lever is to be pulled by a Horse walking upon a floor
which floor is to be level with the circle in which the gudg-
eon and stay of the top end of the shaft or Wheel works or
rolls round. The end of the lever from which the Horse pulls
is applied against the gudgeon that is confined in the top end
of the shaft of the Wheel. A Shaft Eight feet long and a Wheel
twenty feet diameter with the incline of two and a quarter in-
ches to the foot. will make a circle thirty six inches in diame-
ter. giving the Horse a walk of 20 feet in diameter and the
advantage of Lever of 10 feet against 18 inches. The Wheel
and walk of the Horse may be proportioned in size together.
with ~~with~~ the size of the circle to suit any Machine that.
may be applied which is desinged to be applied to Grist Mills
Saw Mills Cotton Gins and all other machinery which requires
the power of a Horse

What I claim as my own invention. and not previously
known in the above described Machine is the application of the lever to
the top end of the shaft. and the top end of the shaft moving round
in the circle with the inclination of two and a fourth inches to the foot
and the application of dead weight instead of lever on the verge of the
Wheel proportioned in weight to the size of the machine. For further
illustration of my invention I refer to the model deposited in the
Patent Office at Washington viz January 10th 1835

Witnesses
Wm. M. Lawrence [illegible]
John Parker

Luke M. Edwards
744 [illegible]

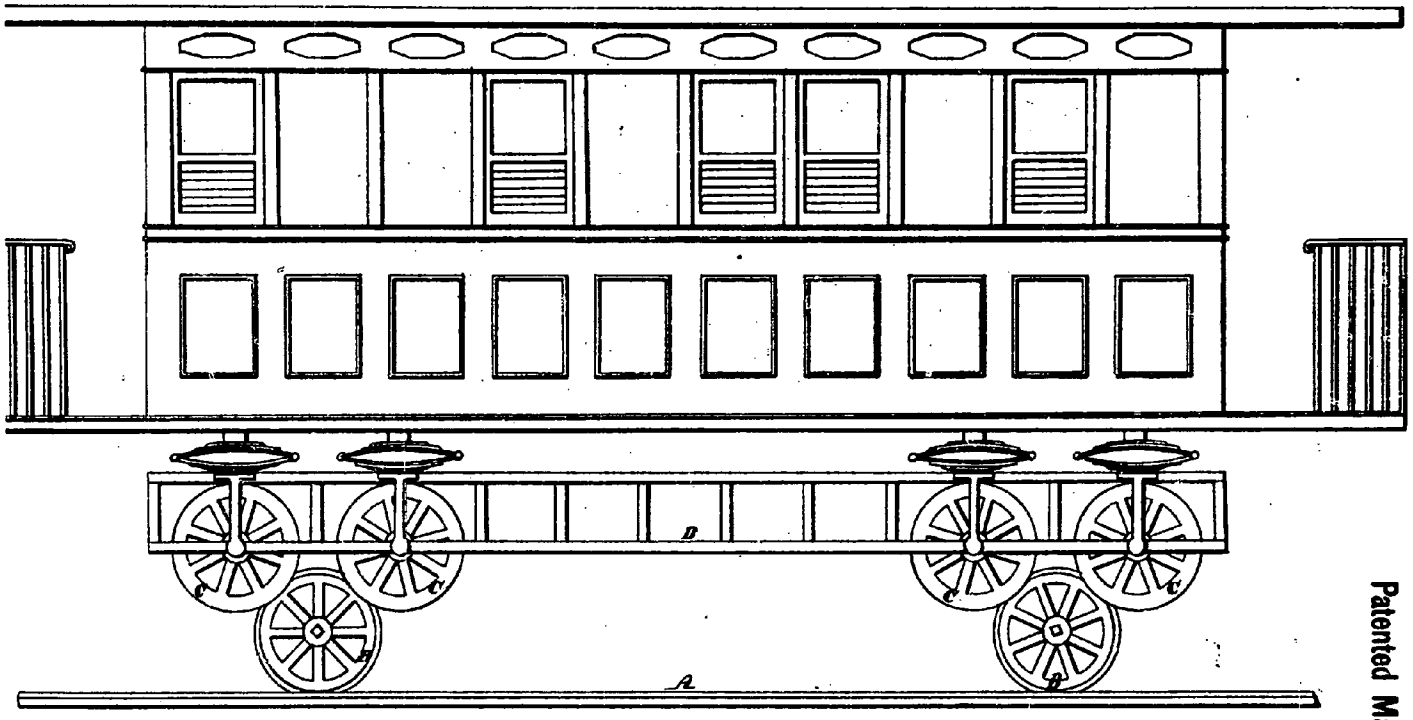

United States Patent
Patent No.: X8664
S. CHAPMAN.
Car Truck.
Patented Mar. 2, 1835.